United States Patent
Armitage et al.

(10) Patent No.: US 9,551,420 B2
(45) Date of Patent: Jan. 24, 2017

(54) SEALING RING

(71) Applicant: American Seal And Engineering Company, Inc., Orange, CT (US)

(72) Inventors: Mark W. Armitage, Madison, CT (US); Dallas Conway, Prospect, CT (US)

(73) Assignee: American Seal and Engineering Company, Inc., Orange, CT (US)

(*) Notice: Subject to any disclaimer, the term of this patent is extended or adjusted under 35 U.S.C. 154(b) by 312 days.

(21) Appl. No.: 14/485,429

(22) Filed: Sep. 12, 2014

(65) Prior Publication Data
US 2016/0076650 A1    Mar. 17, 2016

(51) Int. Cl.
*F16J 15/02* (2006.01)
*F16J 15/32* (2016.01)

(52) U.S. Cl.
CPC ........... *F16J 15/025* (2013.01); *F16J 15/3232* (2013.01); *F16J 15/3236* (2013.01)

(58) Field of Classification Search
CPC ............ F16J 15/00; F16J 15/02; F16J 15/025; F16J 15/3204; F16J 15/3232; F16J 15/3236
See application file for complete search history.

(56) References Cited

U.S. PATENT DOCUMENTS

| 2,392,182 A | 1/1946 | Payne |
| 2,841,429 A | 7/1958 | McCuisition |
| 2,888,281 A | 5/1959 | Ratti |
| 3,047,300 A * | 7/1962 | Taylor ............... F16J 15/3204 277/530 |
| 3,047,301 A | 7/1962 | Taylor |
| 3,052,478 A | 9/1962 | Horvereid |
| 3,183,008 A | 5/1965 | Yost |
| 3,228,705 A | 1/1966 | Underwood |
| 3,288,475 A | 11/1966 | Benoit |
| 3,608,913 A * | 9/1971 | D'Assignies ........ F16J 15/3236 277/530 |
| 3,612,551 A | 10/1971 | Grabill |

(Continued)

FOREIGN PATENT DOCUMENTS

| CN | 201047442 | 4/2008 |
| EP | 0806594 | 11/1997 |
| WO | 2011/050837 | 5/2011 |

OTHER PUBLICATIONS

Internet Advertisement for Parker Hannifin X-Seal. The document was downloaded from the internet on Oct. 10, 2013. The original publication date is not known.

*Primary Examiner* — Vishal Patel
(74) *Attorney, Agent, or Firm* — Raymond A. Nuzzo

(57) ABSTRACT

A sealing ring (10) includes in a diametrical cross-section a body section (12), angularly spaced sealing legs (16) and (18) that extend from the body section (12) and angularly spaced sealing legs (22) and (24) that also extend from the body section (12). Each sealing leg (16, 18, 22, 24) extends to a beveled end (28, 30, 32, 34), respectively. Beveled ends (28, 30, 32, 34) form a seal with a surface when sealing ring (10) is subjected to compressive forces. Sealing legs (16) and (24) are coplanar. Sealing legs (18) and (22) are coplanar. A first centering leg (40) extends from the body section (12) and is between sealing legs (16) and (22). A second centering leg (44) extends from the body section (12) and is between sealing legs (18) and (24). The first and second centering legs (40) and (44) are coplanar.

14 Claims, 10 Drawing Sheets

(56) References Cited

U.S. PATENT DOCUMENTS

| | | | | |
|---|---|---|---|---|
| 3,682,489 A | * | 8/1972 | Fischer | F16J 15/447 |
| | | | | 277/590 |
| 4,199,158 A | * | 4/1980 | de Munck | E02B 3/16 |
| | | | | 277/648 |
| 4,585,238 A | * | 4/1986 | Nicholson | F16J 15/3236 |
| | | | | 277/555 |
| 4,787,642 A | * | 11/1988 | Etheridge | E21B 33/04 |
| | | | | 277/550 |
| 5,002,290 A | | 3/1991 | Pernin | |
| 5,246,236 A | * | 9/1993 | Szarka | E21B 34/06 |
| | | | | 277/337 |
| 5,372,230 A | * | 12/1994 | Niklewski | B65G 39/09 |
| | | | | 193/37 |
| 7,857,322 B2 | | 12/2010 | Fietz | |
| 2013/0113165 A1 | | 5/2013 | Sueyoshi et al. | |

\* cited by examiner

SEALING RING

STATEMENT OF GOVERNMENT INTEREST

Not applicable.

CROSS REFERENCE TO RELATED APPLICATIONS

None.

BACKGROUND

Sealing rings, also known as annular seals or O-rings, are widely used in industrial, automotive and machinery applications. Typical sealing rings are disclosed in U.S. Pat. Nos. 2,392,182, 7,857,322, 3,288,475, 3,052,478, 2,888,281, 2,841,429, 3,228,705, 3,047,301, 3,183,008, 3,612,551 and 5,002,290, U.S. Patent Application Publication No. 20130113165, European Patent No. EP0806594 and Chinese Patent No. CN201047442.

A common prior art technique of accomplishing bidirectional sealing entails the use of two C-seals or spring energized seals facing back to back to handle pressure on the inner diameter or the outer diameter. Each seal must be positioned in a separate groove to provide support from the pressure on the opposite side of the seal. Positioning the seals in separate grooves is necessary because if the seals were positioned in the same groove, the seals would slide into each other thereby compromising the sealing integrity of both seals.

SUMMARY

The present invention is a sealing ring (10) having in a diametrical cross-section a body section (12) and a first pair of sealing legs (16) and (18) that extend outwardly from and are integral with the body section (12) and are angularly spaced apart by a first angle. The sealing ring (10) further includes in the diametrical cross-section a second pair of sealing legs (22) and (24) that extend outwardly from and are integral with the body section (12) and are spaced apart by a second angle. Each sealing leg (16), (18), (22) and (24) extends to a beveled end (28), (30), (32) and (34), respectively, which is configured to form a seal with a surface when the sealing ring (10) is subjected to compression or compressive stress. Sealing legs (16) and (24) are substantially coplanar. Sealing legs (18) and (22) are substantially coplanar. The plane in which sealing legs (16) and (24) are lying intersects the plane in which sealing legs (18) and (22) are lying. Stated another way, the plane of sealing legs (16) and (24) intersect the plane of sealing legs (18) and (22). Sealing ring (10) further comprises in the diametrical cross-section a first centering leg (40) that outwardly extends from and is integral with the body section (12) and is located between and angularly spaced apart from sealing leg (16) and sealing leg (22), and a second centering leg (44) that outwardly extends from and is integral with the body section (12) and is located between and angularly spaced apart from sealing leg (18) and sealing leg (24). The first and second centering legs (40) and (44) are substantially coplanar. When sealing ring (10) is positioned in annular groove (100), the first and second centering legs (40) and (44) center the sealing ring (10) and limit the lateral movement of the sealing ring (10).

Various embodiments of the present invention may incorporate one or more of these and other features described herein. A better understanding of the nature and advantages of the present invention may be gained by reference to the following detailed description and the accompanying drawings.

DETAILED OF ILLUSTRATIVE EMBODIMENTS

As used herein, the term "free height" refers to the height of sealing ring 10 when the sealing ring 10 is not installed in any application and has no pressure or compressive forces thereon.

Figure 1:
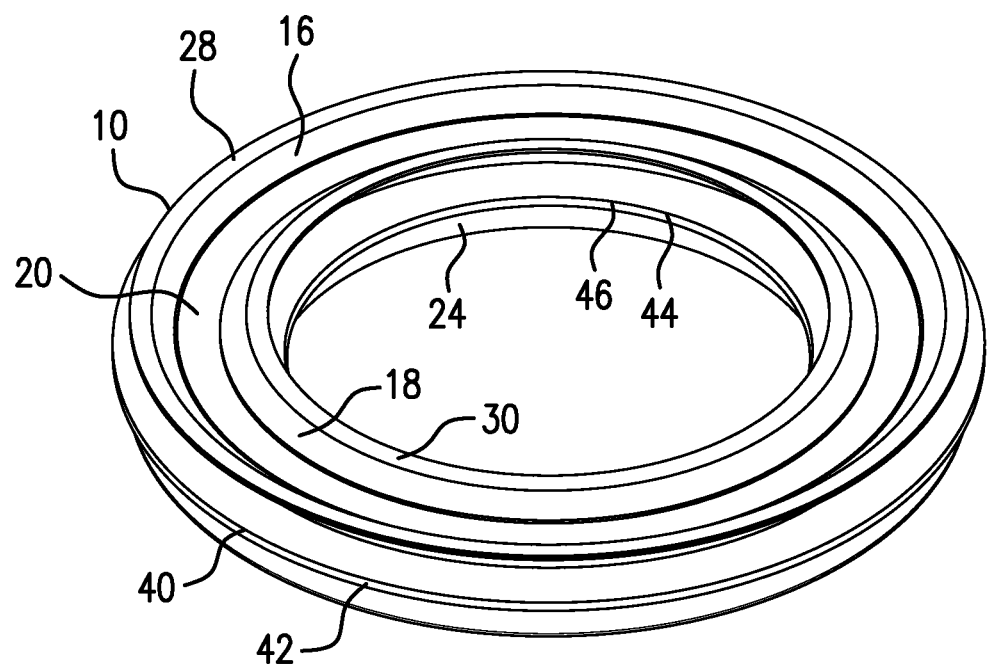
FIG. 1 is an isometric view of the sealing ring of the present invention.
Figure 2:
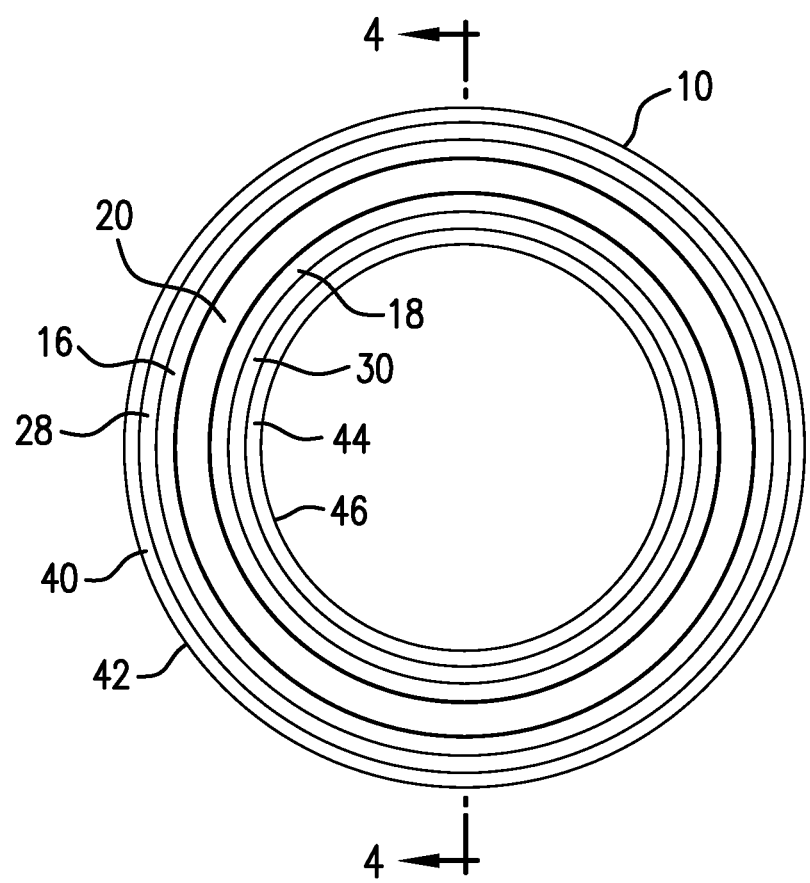
FIG. 2 is a top view of the sealing ring.
Figure 3:
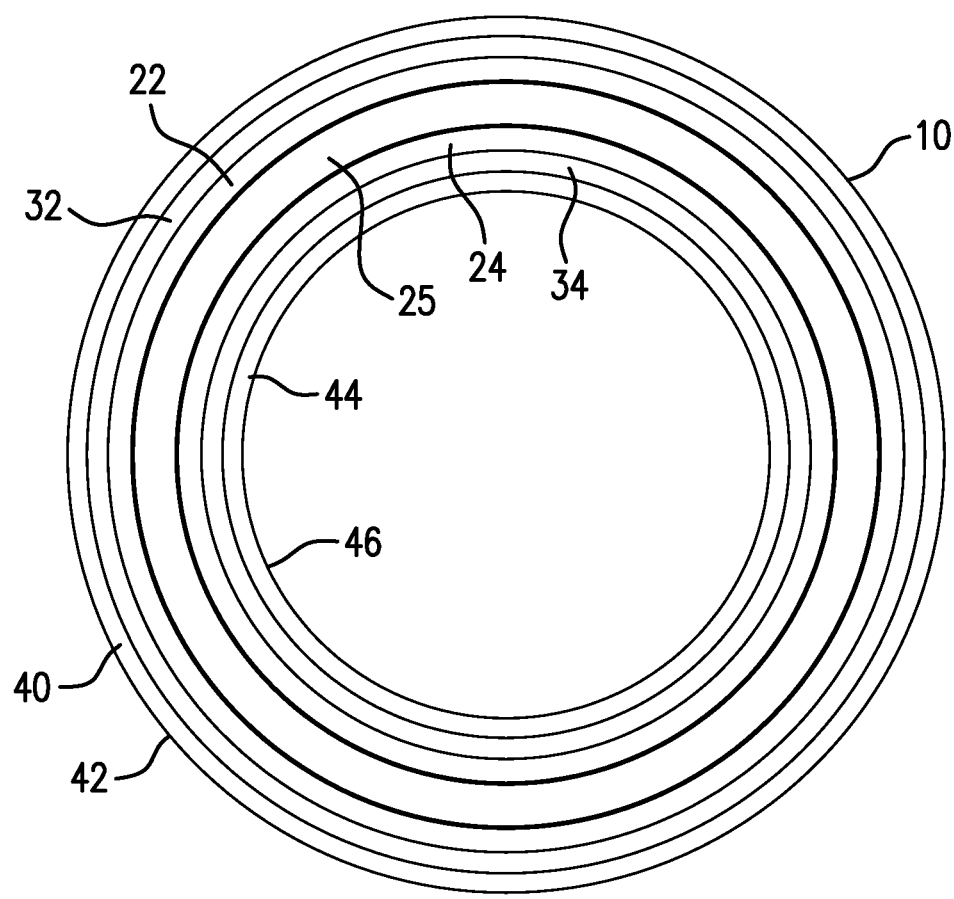
FIG. 3 is a bottom view of the sealing ring.
Figure 4:
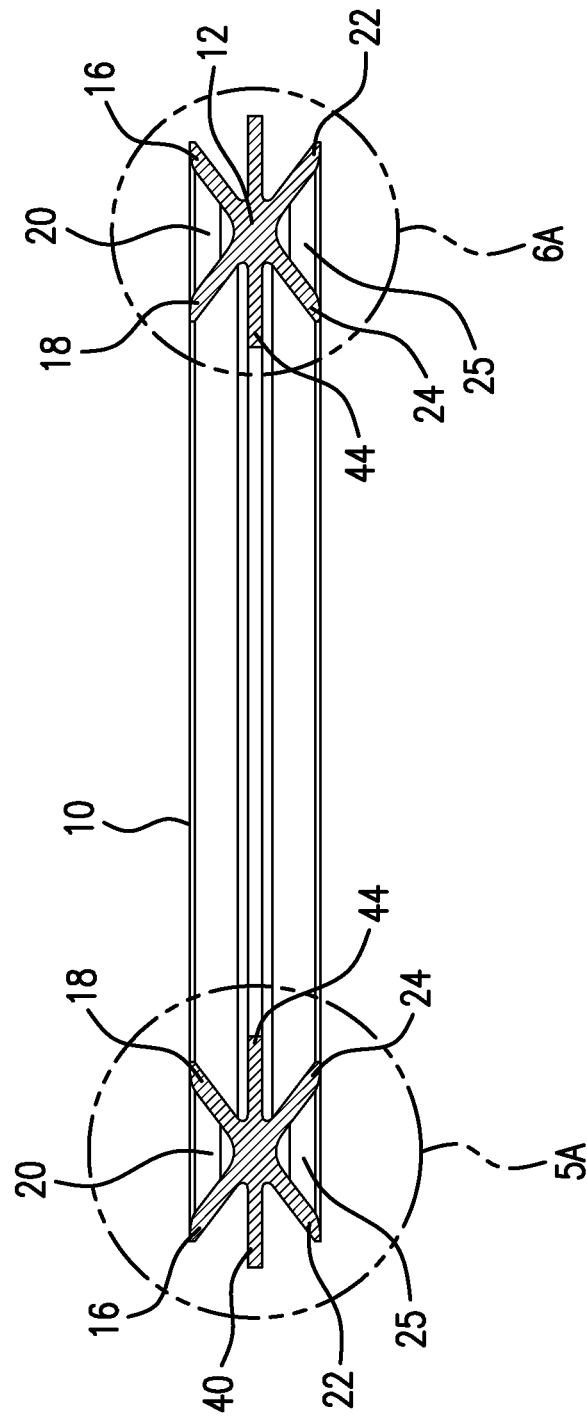
FIG. 4 is a cross-sectional view taken along line 4-4 in FIG. 2.
Figure 5A:
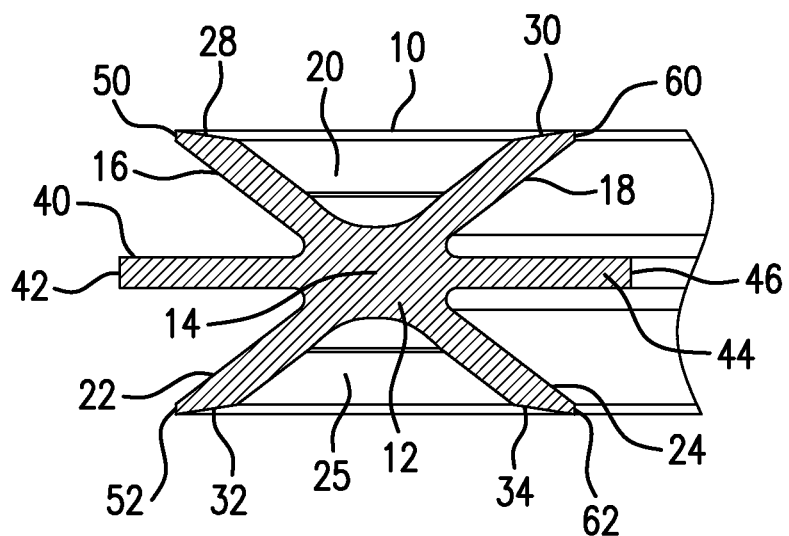
FIG. 5A is an enlarged version of the view indicated by reference number 5A in FIG. 4.
Figure 5B:
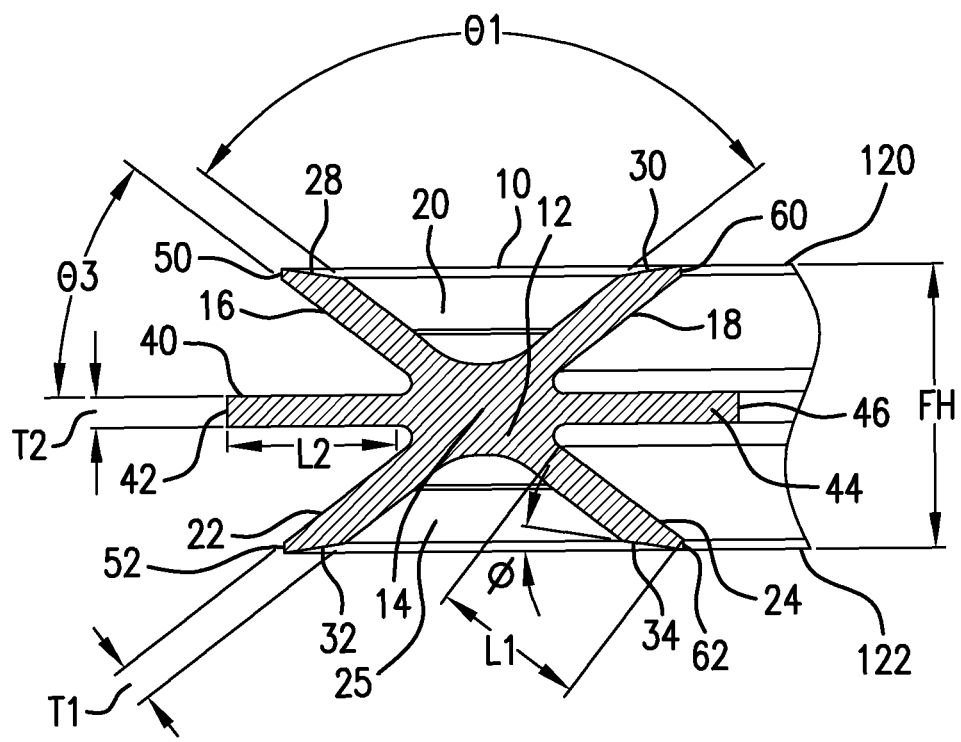
FIG. 5B is the same view as FIG. 5A, the view showing reference lines and other indicia to indicate angles and dimensions of various portions of the sealing ring.

Referring now to FIGS. 1-5A, 5B, 6A and 6B, there is shown sealing ring 10 according to the present invention. Sealing ring 10 has in a diametrical cross-section a body section 12 (see FIGS. 5A and 6A). The center of body section 12 is indicated by reference number 14. Sealing ring 10 further includes in the diametrical cross-section a first pair of sealing legs 16 and 18 that extend outwardly from and are integral with the body section 12. Sealing legs 16 and 18 are angularly spaced apart by a first angle θ1. The geometrical configuration of sealing legs 16 and 18 form a channel or curved recess 20 between sealing legs 16 and 18. Sealing ring 10 further includes in the diametrical cross-section a second pair of sealing legs 22 and 24 that extend outwardly from and are integral with the body section 12. Sealing legs 22 and 24 are spaced apart by a second angle θ2 (see FIG. 5C). The geometrical configuration of sealing legs 22 and 24 form a channel or curved recess 25 between sealing legs 22 and 24. Each sealing leg 16, 18, 22 and 24 extends to a beveled end 28, 30, 32 and 34, respectively. Each beveled end 28, 30, 32 and 34 is configured to form a seal with a surface when the sealing ring 10 is under pressure or subjected to compressive stress. As shown in FIG. 5B, each beveled end 28, 30, 32 and 34 is beveled in accordance with a predetermined bevel angle θ which is discussed in detail in the ensuing description.

Sealing leg 16 and sealing leg 24 are substantially coplanar. Sealing leg 18 and sealing leg 22 are substantially coplanar. The plane in which sealing legs 16 and 24 lie intersects the plane in which sealing legs 18 and 22 lie, wherein the point of intersection is at center 14 of body section 12. Sealing ring 10 further comprises in the diametrical cross-section a first centering leg 40 that outwardly extends from and is integral with body section 12 and is located between and angularly spaced apart from sealing legs 16 and 22. First centering leg 40 extends to end 42. The sealing ring 10 further comprises in the diametrical cross-section a second centering leg 44 that outwardly extends from and is integral with body section 12 and is located between and angularly spaced apart from sealing legs 18 and 24. Second centering leg 44 extends to end 46. The first and second centering legs 40 and 44 are substantially coplanar and lie in a plane that extends through center 14 of body section 12. Therefore, the plane in which sealing legs 16 and 24 lie and the plane in which sealing legs 18 and 22 lie intersect the plane in which centering sections 40 and 44 lie and all planes intersect each other at the center 14 of body section 12.

Figure 7:
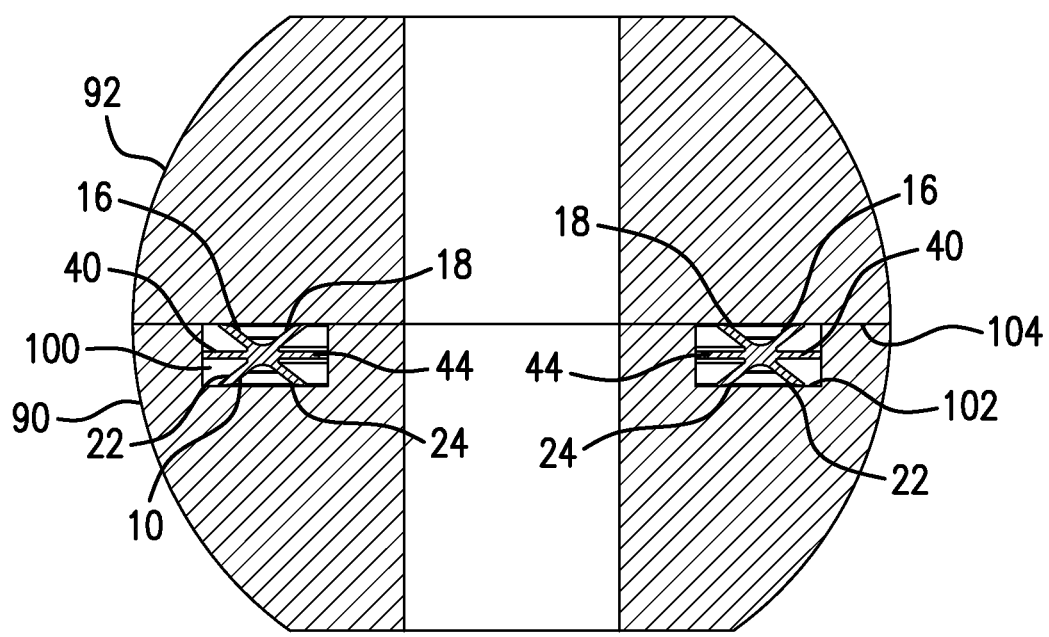
FIG. 7 is a cross-sectional view showing the sealing ring in use to create a seal between two components.

Referring to FIG. 7, there is shown an apparatus having two parts, components or sections 90 and 92. Component 90 has an annularly extending channel or groove 100 and a wall or surface 102 within groove 100. Component 92 has a surface 104 that confronts groove 100. Sealing ring 10 is disposed within annularly extending groove 100. The functions of first and second centering legs 40 and 44 are to center the sealing ring 10 within groove 100 and to limit the lateral movement of the sealing ring 10 while positioned in groove 100.

Figure 5C:
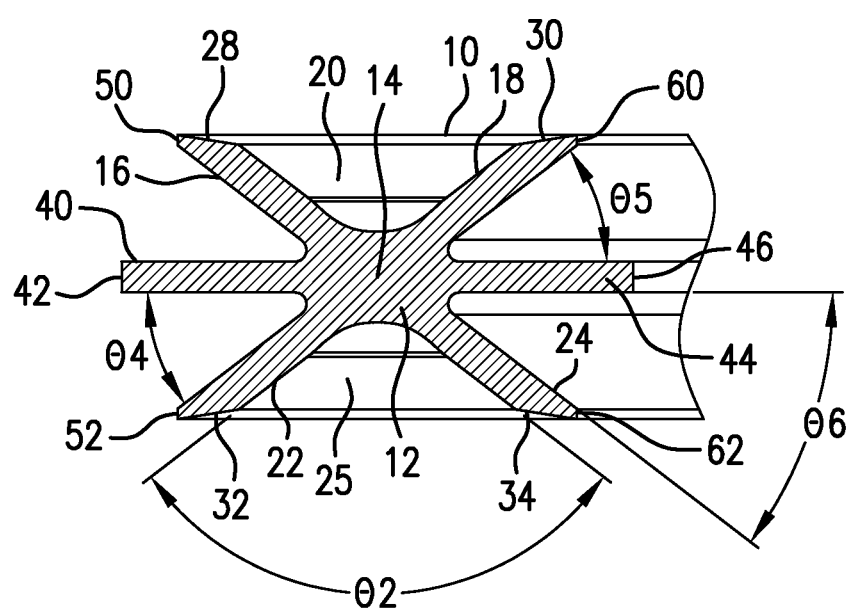
FIG. 5C is the same view as FIG. 5A, the view showing reference lines and other indicia to indicate angles and dimensions of various portions of the sealing ring.

Referring to FIGS. 5B and 5C, in accordance with the invention, first angle θ1 is equal to second angle θ2. In one embodiment, first angle θ1 and second angle θ2 are 105 degrees. First centering leg 40 is angularly spaced apart from the sealing leg 16 by a third angle θ3 and is angularly spaced apart from sealing leg 22 by a fourth angle θ4. In accordance with the invention, third angle θ3 is equal to the fourth angle θ4. In one embodiment, the third angle θ3 and fourth angle θ4 are 37 degrees. Second centering leg 44 is angularly spaced apart from sealing leg 18 by a fifth angle θ5 and angularly spaced apart from sealing leg 24 by a sixth angle θ6. In accordance with the invention, fifth angle θ5 is equal to the sixth angle θ6. In one embodiment, the fifth angle θ5 and sixth angle θ6 are 37 degrees.

Referring to FIGS. 5A, 5B, 6A and 6B, each beveled end 28, 30, 32 and 34 of each sealing leg 16, 18, 22 and 24, respectively, is beveled in accordance with a predetermined bevel angle φ. Sealing ring 10 is fabricated from a material that provides sealing ring 10 with a degree of resiliency such that when sealing ring 10 is subjected to compression or a compressive stress, there is a slight deformation in sealing legs 16, 18, 22 and 24 that causes the entire surface of each beveled end 28, 30, 32 and 34, respectively, to fully contact and become flush with the channel walls or other surfaces that confront the beveled ends 28, 30, 32 and 34. This is illustrated in FIG. 7. Sealing ring 10 is disposed within a channel or groove 100 and is subjected to a compressive force created by components 90 and 92. As a result of this force and the degree of resiliency of sealing ring 10, the entire surface of each beveled end 28 and 30 fully contacts and becomes flush with surface 104 of component 92 and the entire surface of each beveled end 32 and 34 fully contacts and becomes flush with surface 102 of component 90 thereby creating a high-integrity seal between components 90 and 92. In one embodiment, the predetermined bevel angle φ is seven degrees.

Referring to FIG. 5B, sealing ring 10 has a free height FH which is the maximum height of sealing ring 10 when sealing ring 10 is uninstalled and not subjected to any compression or compressive forces. The free height FH may be measured between edge 120 of sealing leg 18 and edge 122 of sealing leg 24. In one embodiment of the invention, the ratio of bevel angle φ to free height FH is within the range of about 70:1 to about 90:1.

Figure 6A:
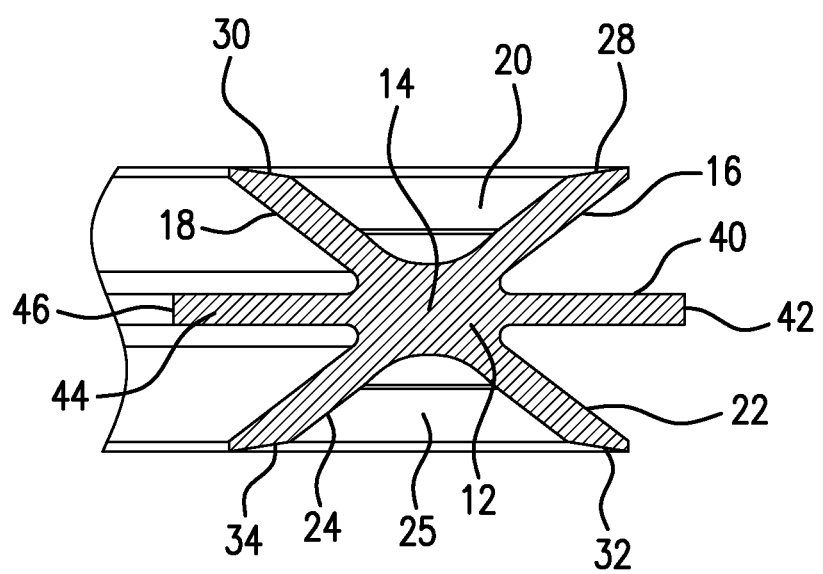
FIG. 6A is an enlarged version of the view indicated by reference number 6A in FIG. 4.
Figure 6B:
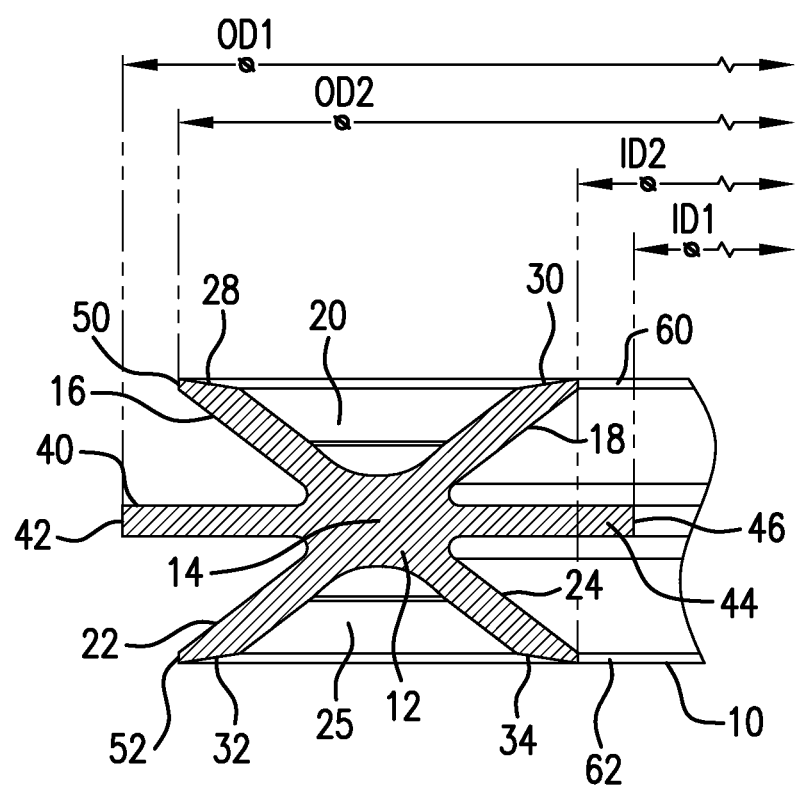
FIG. 6B is the same view as FIG. 6A, the view showing reference lines and other indicia to indicate dimensions of various portions of the sealing ring.

As shown in FIG. 6B, sealing ring 10 has a first outer diameter OD1 that is measured at end 42 of first centering leg 40. In one embodiment of the invention, the ratio of first outer diameter OD1 to free height FH is within a predetermined range for a particular first outer diameter OD1. For example, in one embodiment, for first outer diameters OD1 of about 1.0 inch to 3.0 inches, the ratio OD1/FH is within a range of about 0.112 to about 0.037. For first outer diameters OD1 of 3.0 inches to 6.0 inches, the ratio OD1/FH is within a range of about 0.046 to about 0.023. For first outer diameters OD1 of 6.0 inches to 12.0 inches, the ratio OD1/FH is within a range of about 0.028 to about 0.014. It is to be understood that these outer diameter OD1 dimensions and ratios may vary depending upon the application in which sealing ring 10 is used and the materials from which the sealing ring 10 is fabricated.

Referring to FIG. 6B, sealing ring 10 has a second outer diameter OD2 which is less than first outer diameter OD1. Second outer diameter OD2 may be measured at outer portion 50 of sealing leg 16 and may also be measured at outer portion 52 of sealing leg 22. In one embodiment, the first outer diameter OD1 is about 1.0 inch and the second outer diameter OD2 is about 0.956 inch.

Referring to FIG. 6B, sealing ring 10 has a first inner diameter ID1 that is measured at end 46 of second centering leg 44. Sealing ring 10 also has a second inner diameter ID2 that is greater than the first inner diameter ID1. Second inner diameter ID2 is measured at portion 60 of sealing leg 18 and may also be measured at portion 62 of sealing leg 24. In one embodiment, first inner diameter ID1 is about 0.60 inch and second inner diameter ID2 is about 0.644 inch.

Referring to FIG. 5B, each sealing leg 16, 18, 22 and 24 has a thickness T1. In one embodiment, thickness T1 is about 0.015 inch. First centering leg 40 and second centering leg 44 each have a thickness T2. In one embodiment, thickness T2 is about 0.012 inch. Each sealing leg 16, 18, 22 and 24 has a length L1. In one embodiment, length L1 is about 0.061 inch. Each centering leg 40 and 44 has a length L2. In one embodiment, length L2 is about 0.067 inch.

It is to be understood that the foregoing dimensions of sealing ring 10 may be varied depending upon the application in which sealing ring 10 is to be used.

In a preferred embodiment, sealing ring 10 is fabricated from alloys such as Inconel alloys and Hastelloy alloys. In other embodiments, sealing ring 10 may be fabricated from rubbers, elastomers, plastics and composites. In alternate embodiments, sealing ring 10 may be fabricated from other metals.

The design and configuration of sealing ring 10 allows sealing ring 10 to be used in situations wherein there are two sources of pressure, one on either side of sealing ring 10, wherein each source of pressure could be positive pressure or negative pressure. Examples of positive pressure are positive hydraulic pressure, hydrostatic pressure, pneumatic pressure or a positive vacuum pressure. The positive pressure would be on both the inner diameter and outer diameter of the sealing ring 10. An example of negative pressure is a negative vacuum pressure. Typical applications for sealing ring 10 include offshore drilling wells wherein there would be hydrostatic pressure on one side of sealing ring 10 and oil pressure on the other side of sealing ring 10. For positive pressure sealing, the pressure is on the inner and outer diameters to pressure-energize sealing ring 10. For negative vacuum pressures, the negative pressure may be on either side of sealing ring 10. An application wherein the negative pressure may be on either side of sealing ring 10 is a retort wherein there is vacuum pressure on the outer diameter or inner diameter and positive pressure on the opposite side of sealing ring 10. An example of positive pressure is atmospheric pressure or higher pressure. Sealing ring 10 may also be used as a redundant seal that functions as a back-up seal in the event the first seal fails. Sealing ring 10 requires only a single groove, channel or cavity in contrast to the prior art C-seals or spring energized seals. Centering legs 40 and 44 locate sealing ring 10 relative to the channel, groove or cavity to prevent sealing ring 10 from sliding and the loss of sealing integrity with pressure or variations in pressure on the outer diameter or the inner diameter. Sealing ring 10 has sufficient stiffness to prevent seal leakage and to prevent sealing ring 10 from being de-energized.

It will be understood that many additional changes in the details, materials, steps and arrangement of parts, which have been herein described and illustrated in order to explain the nature of the invention, may be made by those skilled in the art within the principle and scope of the invention as expressed in the appended claims. Such modifications and variations that may be apparent to a person skilled in the art are intended to be included within the scope of this invention as defined by the accompanying claims.

What is claimed is:

1. A sealing ring having in a diametrical cross-section a body section having a center, a first sealing leg having planar surfaces and which extends outwardly from and is integral with the body section, a second sealing leg having planar surfaces and which extends outwardly from and is integral with the body section, wherein the first and second sealing legs are angularly spaced apart by a first angle, the sealing ring further having in a diametrical cross-section a third sealing leg having planar surfaces and which extends inwardly from and is integral with the body section and a forth sealing leg having planar surfaces and which extends inwardly from and is integral with the body section, wherein the third and forth sealing legs are spaced apart by a second angle, wherein the planar surfaces of the first sealing leg are substantially coplanar with the planar surfaces of the fourth sealing leg and the planar surfaces of the second sealing leg are substantially coplanar with the planar surfaces of the third sealing leg and wherein each sealing leg extends to a beveled end that is configured to form a seal with a surface when the sealing ring is under compressive force, wherein a first centerline extends through the first and forth sealing legs and a second centerline extends through the second and third sealing legs and wherein the first and second centerlines intersect at the body section, the sealing ring further comprising in the diametrical cross-section a first centering leg that outwardly extends from and is integral with the body section and is located between and angularly spaced apart from the first and second sealing legs, the first centering leg extending farther outwardly than the first and second sealing legs, the sealing ring further comprising in the diametrical cross-section a second centering leg that inwardly extends from and is integral with the body section and is located between and angularly spaced apart from the third and forth sealing legs, the second centering leg extending farther inwardly then the third and forth sealing legs, the first and second centering legs and being substantially coplanar, wherein a third centerline extends through the first and second centering legs and the body section, whereby when the sealing ring is positioned within an annular groove, the first and second centering legs center the sealing ring and limit the lateral movement of the sealing ring.

2. The sealing ring according to claim 1 wherein the first, second and third centerlines intersect at the body section.

3. The sealing ring according to claim 1 wherein the first angle is equal to the second angle.

4. The sealing ring according to claim 1 wherein the first centering leg is angularly spaced apart from the first sealing leg by a third angle and the first centering leg is angularly spaced apart from the second sealing leg by a fourth angle.

5. The sealing ring according to claim 4 wherein the third angle is equal to the fourth angle.

6. The sealing ring according to claim 1 wherein the second centering leg is angularly spaced apart from the third sealing leg by a fifth angle and the second centering leg is angularly spaced apart from the forth sealing leg by a sixth angle.

7. The sealing ring according to claim 6 wherein the fifth angle is equal to the sixth angle.

8. The sealing ring according to claim 1 wherein each beveled end of each sealing leg is beveled in accordance with a predetermined bevel angle.

9. The sealing ring (10) according to claim 8 wherein the sealing ring has a free height FH when the sealing ring is uninstalled and wherein the ratio of the bevel angle to the free height FH is within a range of about 70:1 to about 90:1.

10. The sealing ring according to claim 9 wherein first centering leg extends to a first end and the second centering leg extends to a second end (46), and wherein the sealing ring has an outer diameter OD1 that is measured at the first end and wherein the ratio of the outer diameter OD1 to the free height FH is within a range of about 0.112 to about 0.037 when the outer diameter OD1 is within a range of about 1.0 inch to 3.0 inches.

11. The sealing ring according to claim 9 wherein first centering leg extends to a first end and the second centering leg extends to a second end, and wherein the sealing ring has an outer diameter OD1 that is measured at the first end and wherein the ratio of the outer diameter OD1 to the free height FH is within a range of about 0.046 to about 0.023 when the outer diameter OD1 is within the range of 3.0 inches to 6.0 inches.

12. The sealing ring according to claim 9 wherein first centering leg extends to a first end and the second centering leg extends to a second end (46), and wherein the sealing ring has an outer diameter OD1 that is measured at the first end (42) and wherein the ratio of the outer diameter OD1 to the free height FH is within a range of about 0.028 to about 0.014 when the outer diameter OD1 is within the range of 6.0 inches to about 12.0 inches.

13. The sealing ring according to claim 1 wherein the sealing seal is fabricated from a material chosen from the group comprising rubbers, elastomers, metals, metal alloys, plastics and composites.

14. The sealing ring according to claim 1 wherein the sealing ring is fabricated from a metal alloy chosen from the group comprising Inconel alloys and Hastelloy alloys.

* * * * *